United States Patent
Ahringer et al.

(10) Patent No.: US 11,544,585 B2
(45) Date of Patent: Jan. 3, 2023

(54) ANALYZING VIEWER BEHAVIOR IN REAL TIME

(71) Applicant: Disney Enterprises, Inc., Burbank, CA (US)

(72) Inventors: Adam S. Ahringer, Bellevue, WA (US); Giuseppe Manzari, Sunland, CA (US); Inna Giguere, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 968 days.

(21) Appl. No.: 16/188,959

(22) Filed: Nov. 13, 2018

(65) Prior Publication Data

US 2020/0151587 A1 May 14, 2020

(51) Int. Cl.
*G06N 5/04* (2006.01)
*G06N 20/00* (2019.01)
*H04L 67/12* (2022.01)

(52) U.S. Cl.
CPC .............. *G06N 5/04* (2013.01); *G06N 20/00* (2019.01); *H04L 67/12* (2013.01)

(58) Field of Classification Search
CPC .......... G06N 5/04; G06N 20/00; H04L 67/12; H04L 63/30; H04L 63/302; H04L 65/60; H04L 65/608; H04N 21/258; H04N 21/63; H04N 21/251
See application file for complete search history.

(56) References Cited

U.S. PATENT DOCUMENTS

| 9,378,467 B1 | 6/2016 | Chaiyochlarb et al. |
| 9,448,962 B2 | 9/2016 | Sharon et al. |
| 10,305,955 B1 * | 5/2019 | Li ..................... H04L 65/4084 |

(Continued)

FOREIGN PATENT DOCUMENTS

| CN | 103475951 A | 12/2013 |
| CN | 104239416 A | 12/2014 |

(Continued)

OTHER PUBLICATIONS

Extended European Search Report for Application No. 19206046.1208 dated Oct. 3, 2020.

(Continued)

*Primary Examiner* — Dave Misir
(74) *Attorney, Agent, or Firm* — Patterson + Sheridan, LLP

(57) ABSTRACT

Systems, methods and articles of manufacture for are provided for analyzing user behavior in real time by ingesting telemetry data related to a streaming media application; feeding the telemetry data to a machine learning model (MLM) that produces a User Experience (UX) command based on the telemetry data and prior telemetry data received from the content streaming application; selecting content items to provide to the client device based on the telemetry data; determining, based on the telemetry data, whether the client device has sufficient free resources to receive the UX command and the content items in a current time window while providing a predefined level of service; when client device has sufficient free resources to receive the UX command and the content items, encapsulating the UX command with the content items in a content stream; and transmitting the content stream to the client device.

21 Claims, 5 Drawing Sheets

(56) References Cited

U.S. PATENT DOCUMENTS

| | | | |
|---|---|---|---|
| 2015/0172161 A1* | 6/2015 | Isaksson | H04N 21/437 |
| | | | 725/95 |
| 2016/0259840 A1 | 9/2016 | Zheng et al. | |
| 2016/0274744 A1* | 9/2016 | Neumann | H04N 21/47202 |
| 2017/0026713 A1 | 1/2017 | Yin et al. | |
| 2017/0188094 A1* | 6/2017 | Ionescu | H04N 21/2547 |
| 2017/0250882 A1* | 8/2017 | Kellicker | H04L 67/16 |
| 2017/0359626 A1* | 12/2017 | Chen | G11B 27/102 |
| 2018/0007118 A1* | 1/2018 | Loza | H04L 67/025 |
| 2018/0160168 A1 | 6/2018 | Song et al. | |
| 2018/0349793 A1 | 12/2018 | Triolo et al. | |
| 2019/0124403 A1* | 4/2019 | Favicchio | H04N 21/466 |

FOREIGN PATENT DOCUMENTS

| | | |
|---|---|---|
| CN | 106534942 A | 3/2017 |
| CN | 106851345 A | 6/2017 |
| CN | 107612912 A | 1/2018 |
| CN | 108184169 A | 6/2018 |
| CN | 108469975 A | 8/2018 |
| IN | 201741011138 A | 10/2018 |
| WO | 2018005245 A1 | 1/2018 |

OTHER PUBLICATIONS

Jiangfan Feng and Yanhong Liu, "Intelligent Context-Aware and Adaptive Interface for Mobile LBS," Computational Intelligence and Neuroscience, vol. 2015, Article ID 489793, 10 pages, Nov. 5, 2014.

Paul Andrew, "Understanding the Potential of Adaptive User Interfaces," Feb. 5, 2018, 9 pages (Accessed Online <https://speckyboy.com/adaptive-user-interfaces/>.

Krzysztof Gajos, Raphael Hoffman and Daniel S. Weld, "Improving User Interface Personalization," USIT '04, Oct. 24-27, 2004, 2 pages.

Chinese Patent Office, First Chinese Office Action for Application 201911094853.5 dated Sep. 26, 2021.

European Patent Office, Communication pursuant to Article 94(3) EPO for European Patent Application No. 19206046.5-1208, dated Nov. 21, 2022.

Gupchup et al., "Trustworthy Experimentation Under Telemetry Loss", CCS '18: Proceedings of The 2018 ACM SIGSAG Conference On Computer and Communications Security, ACM Press, New York, New York, USA Oct. 17, 2018, pp. 387-396.

\* cited by examiner

ANALYZING VIEWER BEHAVIOR IN REAL TIME

BACKGROUND

Streaming applications provide digital video content to users on demand via various computing devices through the internet. The control and management of streaming applications may be affected by commands input by the viewer (e.g., play a first content item, pause a second content item, turn on captions in a third content item) and behaviors observed by the provider to provide a personalized experience to the individual viewers (e.g., a first viewer watches science fiction but not fantasy—prioritize recommending science fiction content and deprecate recommending fantasy content; a second viewer frequently pauses playback— adjust caching priorities for provisioning continent to the second viewer; a third user frequently turns on captioning— turn on captioning by default for the third user). The management of the content delivery may be managed locally to the viewer via application settings, or may be managed remotely from the viewer by a content provider.

Content providers are provided viewer behavior data in batches to manage streaming applications. Batches of data may include several elements of viewer behavior collected over various time periods. Batched data may be useful in non-real-time management of the streaming application, but are of limited use in real-time management of viewer behaviors, as those data may be received out of sync from the content stream provided to the viewer, and take significant time to process, thus lagging behind the viewer's consumption of the content.

SUMMARY

The present disclosure provides, in one embodiment, a method for analyzing user behavior in real time, the method comprising: ingesting, in real-time, current telemetry data from a client device including playback data, interaction data, and operational data related to a streaming media application; feeding the telemetry data to a machine learning model (MLM) that produces, in real-time, a User Experience (UX) command based on the current telemetry data and prior telemetry data received from the content streaming application and ingested into the MLM at an earlier time; selecting content items to provide to the client device based on the current telemetry data; determining, based on the current telemetry data, whether the client device has sufficient free resources to receive the UX command in addition to the content items in a current time window while providing a predefined level of service; in response to determining that the client device has sufficient free resources to receive the UX command in addition to the content items in the current time window while providing the predefined level of service, encapsulating the UX command with the content items in a content stream; and transmitting the content stream to the client device.

In another embodiment, the present disclosure provides a system enabled to analyze user behavior in real time, the system comprising: a processor; and a memory having instructions embodied therewith that when executed by the processor enable the system to perform an operation comprising: ingesting, in real-time, current telemetry data from a client device including playback data, interaction data, and operational data related to a streaming media application; feeding the telemetry data to a machine learning model (MLM) that produces, in real-time, a User Experience (UX) command based on the current telemetry data and prior telemetry data received from the content streaming application and ingested into the MLM at an earlier time; selecting content items to provide to the client device based on the current telemetry data; determining, based on the current telemetry data, whether the client device has sufficient free resources to receive the UX command in addition to the content items in a current time window while providing a predefined level of service; in response to determining that the client device has sufficient free resources to receive the UX command in addition to the content items in the current time window while providing the predefined level of service, encapsulating the UX command with the content items in a content stream; and transmitting the content stream to the client device.

In a further embodiment of the present disclosure, a system enabled to analyze user data in real time is provided, the system: a processor; a memory having instructions embodied therewith that when executed by the processor enable the system to perform an operation comprising: gathering, in real time, telemetry data for the system related to a streaming media application receiving a content stream; in response to determining that a free bandwidth of the bandwidth available to the system while receiving the content stream satisfies a threshold, transmitting the telemetry data to a streaming server providing the content stream; and in response to receiving a User Experience (UX) command included in the content stream based on the telemetry data, adjusting a setting in the streaming media application.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

The present disclosure provides systems, methods, and computer readable media for analyzing viewer behavior in a streaming environment in real-time. As used herein, the term "real-time" (hyphenated or unhyphenated) may be used interchangeably with the term "near real-time," and shall be understood to include delays imparted due to signal propagation speed, network latency, packet aggregation, processing time, instruction queueing, and the like. The present disclosure provides improvements in computing devices used to remotely manage a user experience (UX) on another computing device at another location. User behaviors and device capabilities are analyzed in real-time to improve the UX without negatively affecting the playback of content. By analyzing viewer behavior in real-time rather than batching data, fewer data entries need to be stored, less bandwidth is required, and the responsiveness of the system to changes in user behavior is improved (increasing flexibility to respond to user demand), among other benefits that one of ordinary skill in the art will appreciate on review of the present disclosure.

Figure 1:
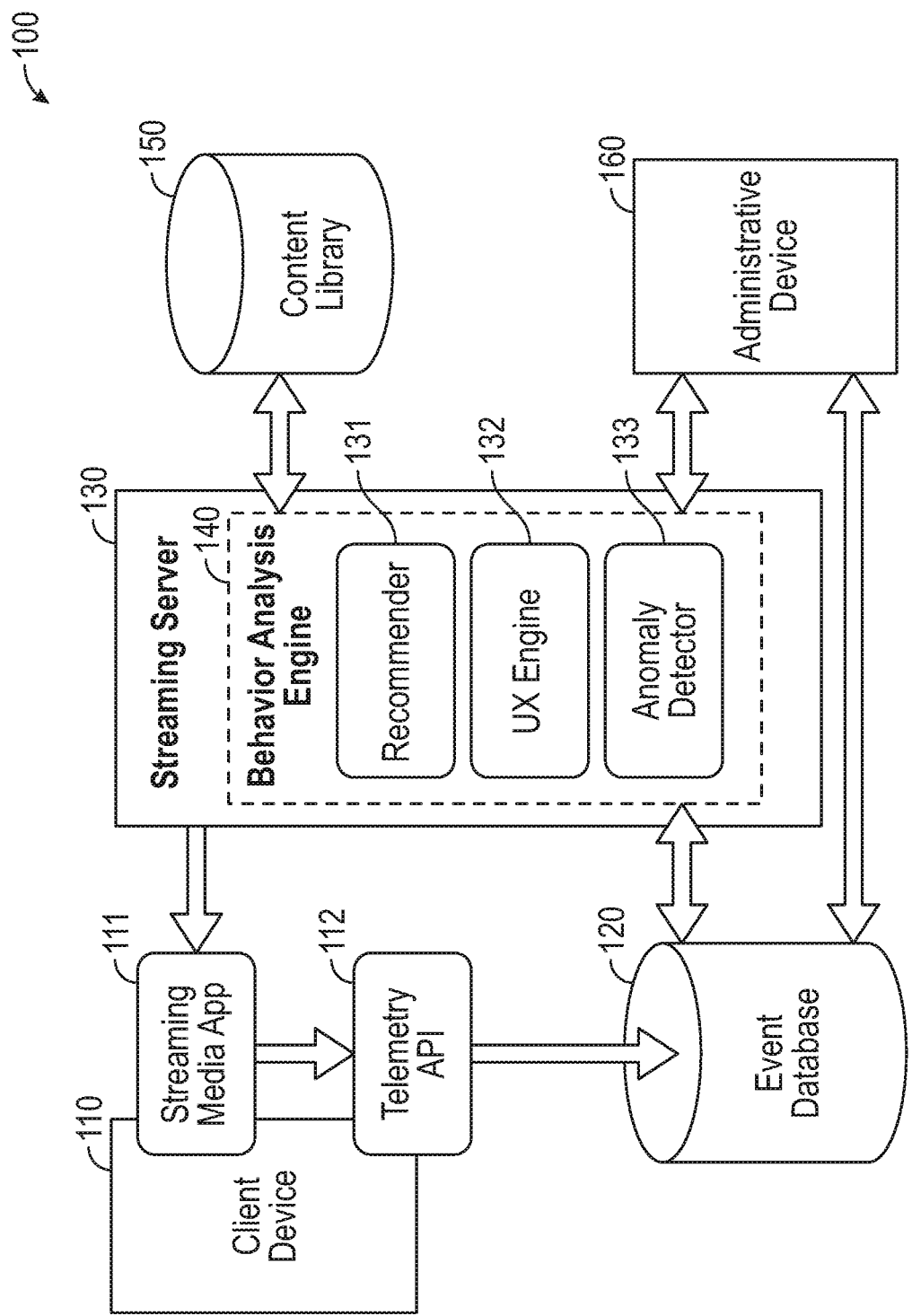
FIG. 1 illustrates a streaming environment, according to aspects of the present disclosure.

FIG. 1 illustrates a streaming environment 100, according to aspects of the present disclosure. In the illustrated embodiment, a client device 110 receives streaming content from a streaming server 130 and provides telemetry data related to the UX of consuming that streaming content to an event database 120. The streaming server 130 accesses the event database 120 to analyze these telemetry data in real time to determine how to optimize the UX on the client device. The streaming server 130 may consult a content library 150 or administrative devices 160 to optimize the UX for the client device.

Figure 5:
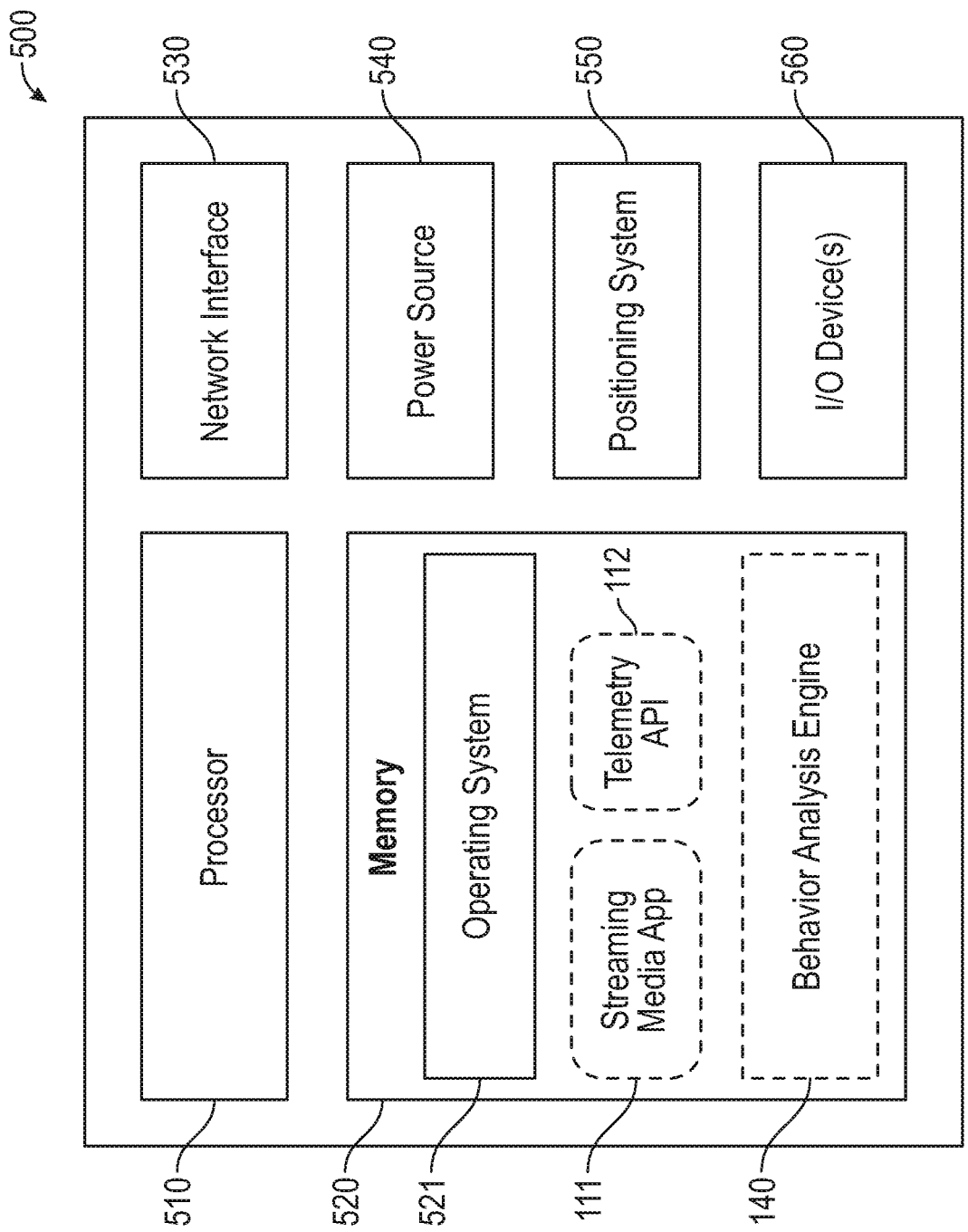
FIG. 5 illustrates a computing device, according to aspects of the present disclosure.

Each of the client device 110, event database 120, streaming server 130, content library 150, and administrative device 160 are various computing devices, the components of which are described in greater detail in regard to FIG. 5. Although one of each element is shown in FIG. 1, it will be understood that one or more of each element may be present in various embodiments. As will also be appreciated, various intermediary devices have been omitted from the illustrated streaming environment 100 so as to not distract from the present disclosure. These intermediary devices may also be one or more computing devices such as, but not limited to: a Content Delivery Network (CDN), router, firewall, wireless access point, network switch, cable distribution system, cellular telephone data network, etc.

The client device 110 is used by an end user (also referred to as a viewer) to consume streaming media content via a streaming media application 111. The streaming media application 111 presents available content to the viewer that the viewer may select between via various user interfaces (UI). These UI may divide available content into various categories, present content at various positions/portions of the display area available to the streaming media application 111, display the streaming media content for playback, and provide other software-based controls related to the playback of streaming content. The streaming media application 111 handles and processes commands received from the viewer, establishing connections to various content providers, playing back the content (including locally caching data to provide the stream), and authenticating the viewer.

The telemetry application program interface (API) 112 works in conjunction with the streaming media application 111 and various other hardware and software provided by the client device 110 to gather telemetry data related to the viewer's behaviors when consuming streaming content or otherwise interacting with the streaming media application 111. In various embodiments, the telemetry API 112 collects data related to which UI elements the viewer interacts with, which content items the viewer consumes, how the viewer consumes content items (e.g., from start to finish, skipping portions, ending consumption before content completion, using trick play options), a time at which the viewer consumes content items, a duration for which the viewer consumes content items, settings used to consume the content item (e.g., volume, closed captions, language, full screen/windowed), a data pathway used for delivery of the content item, and the like. The telemetry API 112 may also be in communication with various other applications and hardware on the client device 110 to record telemetry data related to available uplink/downlink bandwidth, used/free bandwidth, memory usage/free memory, processor usage/free processing resources, screen brightness, device orientation, device location, device orientation, and the like.

The telemetry API 112 transmits the telemetry data to an event database 120, where the telemetry data may be stored and directed to the particular streaming server 130 managing the viewer's UX to provide real-time analysis of the telemetry data for the particular viewer. In various embodiments, the event database 120 stores the telemetry data for review in non-real-time by one or more administrative devices 160 used for customer service, Information Technology (IT) and network administration management, and engineering improvement to the streaming server 130 or behavior analysis engine 140.

The streaming server 130 provides the client device 110 (via the streaming media application 111) streaming media content from a content library 150, and a behavior analysis engine 140 to control and optimize the UX on the client device 110. The streaming server 130 may populate various UI elements with links or pointers to content items available in the content library 150 based on the access permissions of the viewer, parental control settings, a geographic relevancy/access control policies. The content library 150 represents one or more databases that include pre-recorded or live broadcast content items that are made available for various viewers (based on access rights).

The behavior analysis engine 140 provides recommendations for adjustments in the UX from the streaming server 130 to the client device 110 that are customized to the individual viewer (or viewer profile when multiple individuals share an account). The behavior analysis engine 140 ingests and cleanses the telemetry data generated by the client device 110 in real-time to adjust the UX on the client device 110 to improve the viewer's ability to consume the content being streamed by the streaming server 130.

The behavior analysis engine 140 includes several machine learning models (MLM) that include a recommender 131 that is taught according to the content viewing habits of an individual viewer, a UX engine 132 that is taught according to the interaction preferences of the viewer, and an anomaly detector 133 that is taught according to the network characteristics of multiple viewers. The recommender 131 learns content items to suggest to the viewer based on an MLM developed for the individual viewer profile (including profiles shared by multiple persons) based on past content choices and viewer behaviors, and makes recommendations based on the current viewing conditions as reported in the telemetry data. The UX engine 132 learns UI and content delivery preferences for an individual viewer profile based on past UI and content delivery choices made by the viewer, and makes recommendations based on the current viewing conditions as reported by in the telemetry data. The anomaly detector 133 learns how different network and device delivery conditions affect the delivery of content items to a viewer, and makes recommendations based on the current viewing conditions as reported by in the telemetry data. The behavior analysis engine 140 aggregates the recommendations received from the MLMs to determine whether to alter the streaming content provided to the viewer or the settings used in the streaming media application 111 to thereby improve the UX for the viewer.

The administrative device 160 represents one or more computing devices that have access to the streaming server 130 or event database 120 for purposes of managing and analyzing the provision of content. Examples of administrative devices 160 include, but are not limited to: devices used by network engineers, devices used by customer care specialists, password servers, and digital rights management servers.

Figure 2:
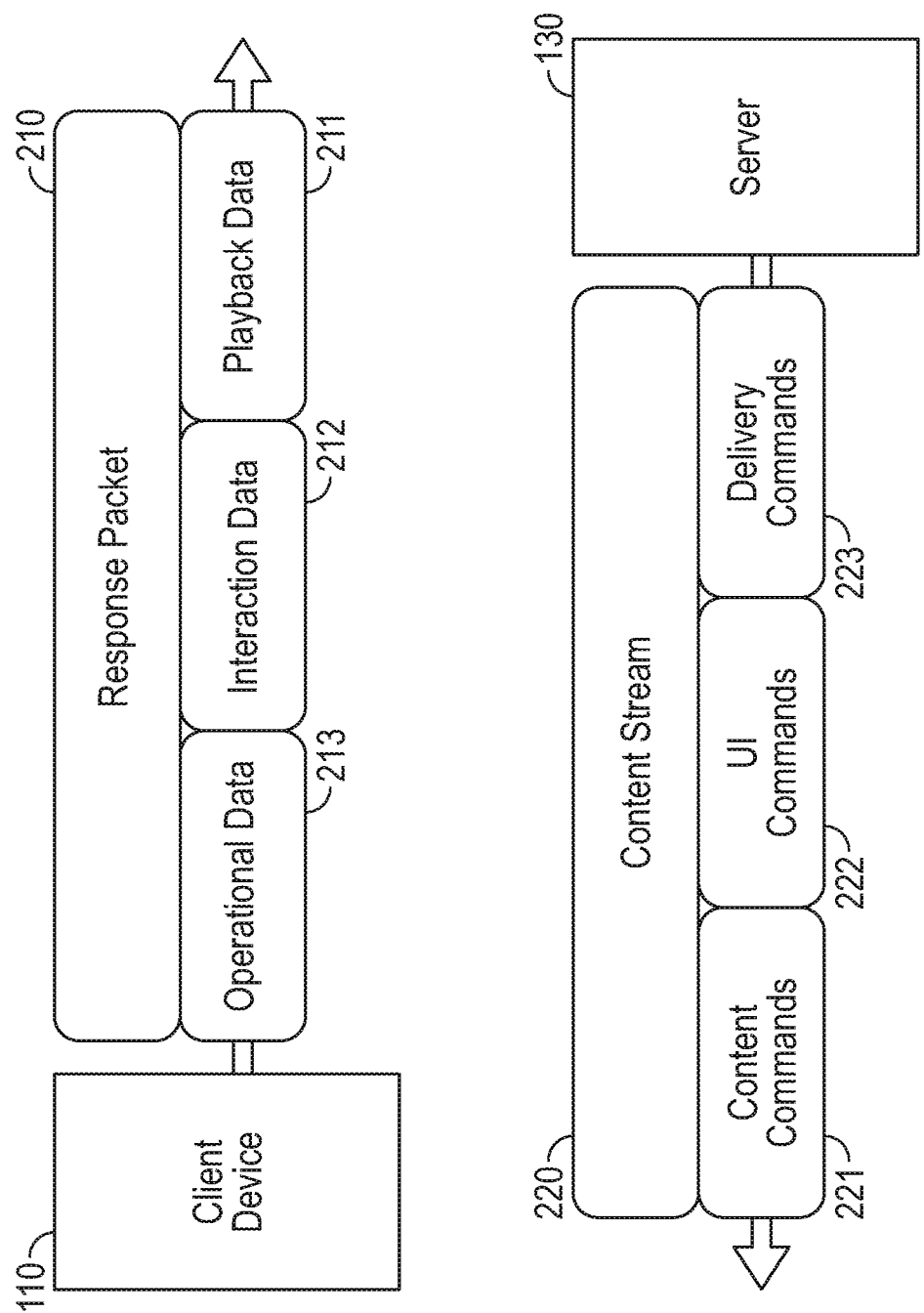
FIG. 2 illustrates data flows, according to aspects of the present disclosure.

FIG. 2 illustrates data flows, according to aspects of the present disclosure. The client device 110 transmits a response packet 210 to the streaming server 130, which may include one or more of playback data 211, interactions data 212, and operational data 213. The streaming server 130 transmits a content stream 220 to the client device, which may include one or more UX commands of content commands 221, UI commands 222, and delivery commands 223 to optimize the UX for the viewer.

The response packet 210 includes information reported from the client device 110 to the streaming server 130 made within the streaming media application 111 such as user authentication messages, log off messages, requests to start service, identification messages for content to playback that are reported to the streaming server 130 and the like. The response packet 210 may be sent in response to a user action within the streaming media application 111, on a periodic basis (e.g., every n seconds), or may be a stream of data. In various embodiments, the streaming media application 111 monitors the performance characteristics of the client device 110, and may elect whether to gather or encapsulate one or more of the playback data 211, interactions data 212, and operational data 213 based on whether the collection and transmission of such telemetry data would negatively affect the UX on the client device 110. For example, when the client device 110 operates in a network with limited or congested uplink bandwidth, the streaming media application 111 may limit the amount of data transmitted in the response packet 210 by excluding one or more of playback data 211, interactions data 212, and operational data 213 from the response packet 210 in a given transmission window. In another example, when the computing resources of the client device 110 (e.g., the processor usage rate or memory usage rate) exceed a threshold, the streaming media application 111 may limit processes executing on the client device 110 related to gathering one or more element of the telemetry data to thereby preserve the UX for the viewer.

The telemetry data include playback data 211, interactions data 212, and operational data 213. Playback data 211 include data related to the content that is being played back for the viewer to consume. The telemetry API 112 gathers user interactions with the streaming media application 111 during playback as playback data 211 including interactions related to a length of time a given content item is played (relative to the length of the content item and absolute), trick play commands made during playback (e.g., skip forward, skip back, fast forward, rewind, pause), extent of trick play commands (e.g., skip for n seconds, skip program introduction, pause for n seconds), inter-media commands (e.g., what content item was last played, which content item is selected next), UI adjustment commands (e.g., captioning, volume, screen size adjustments), etc. Interactions data 212 include data related to how the viewer is interacting with the streaming media application 111. The telemetry API 112 gathers user interactions with the UI of the streaming media application 111 including: icon selections, scrolling actions, settings adjustments (e.g., night mode to day mode, volume control), timing/extent of chained user interactions (e.g., number of content items browsed before selecting one for playback), etc. Operational data 213 include data related to the performance of the client device 110 and the streaming media application 111. The telemetry API 112 gathers performance indicators as operational data 213 including: processor usage rate, memory usage rate, available/free uplink/downlink bandwidth, signal to noise ratio, dropped packets, video quality, screen size, battery life remaining, notifications from other programs running on the client device 110 (e.g., meeting/appointment notifications, upcoming system restarts, upcoming download/upload requests), etc.

The content stream 220 sent from the steaming server 130 to the client device 110 includes primary content requested for playback by the viewer, secondary content selected by the service provider for playback to the viewer (sequentially or concurrently with the viewer-selected primary content), and setup content (e.g., lists of available/recommended content, previews of primary content, icon imagery, profile details). The streaming server 130 may transmit the content stream 220 with various contents at various times during operation of the streaming media application 111. For example, during initial startup of the streaming media application 111, the content stream 220 may include setup content to populate various UI elements in the content stream 220 with information on the content available for streaming, but not include primary or secondary content data. In another example, when playing back a primary content item, the content stream 220 may include data related to the primary content item and data related to a secondary content item of a system message (e.g., related to upcoming system downtime), but not include setup data. As will be appreciated, content that is streamed may be transmitted just-in-time for playback or ahead of a playback time and cached on the client device 110 for eventual playback at an appropriate time.

The behavior analysis engine 140 may use the telemetry data to determine in real-time which content items are to be transmitted to the client device 110. Based on the telemetry data received from the client device 110, the streaming server 130 may also determine to encapsulate one or more of content commands 221, UI commands 222, and delivery commands 223 into the content stream 220. The behavior analysis engine 140 determines when a command should be encapsulated with the content in the content stream 220 so that the viewer is provided an optimized viewing experience. A content command 221 may adjust settings on the client device 110 to cache more or less of a given content item, to cache more or fewer content items, adjust which order cached content items are to be played back/presented for selection, etc. A UI command 222 may adjust settings on the client device 110 to adjust how various elements of the UI are presented to the viewer, including a UI size relative to the available screen real estate, a contrast, a brightness, a volume, a captioning or audio track selection, an arrangement of icons for content or buttons for user commands, a behavior of a hyperlink (e.g., directing a user to different functionality within the streaming media application 111), etc. A delivery command 223 may adjust how the streaming media application 111 receives the content stream 220 including, adjusting a format of the content stream 220 (e.g., from User Datagram Protocol (UDP) to Real Time Streaming Protocol (RTSP)), adjusting a rate/quality of content included in the content stream 220, to select a different intermediary source (e.g., to switch from a first CDN host to a second CDN host), to select a different locale of host (e.g., to select a first local affiliate or a second local affiliate).

Figure 3:
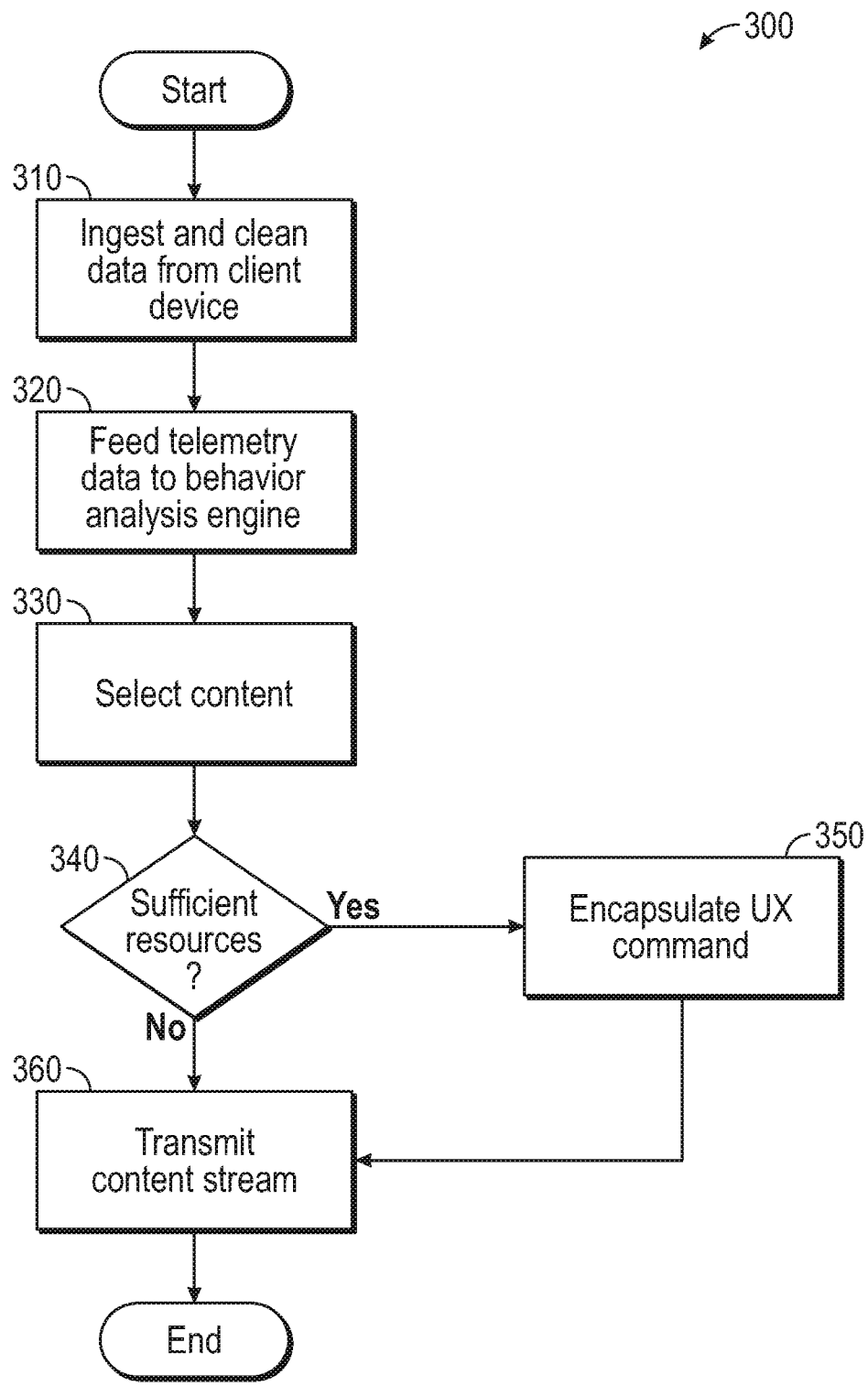
FIG. 3 is a flowchart of a method for analyzing user behavior in real time, according to aspects of the present disclosure.

FIG. 3 is a flowchart of a method 300 for analyzing user behavior in real time, according to aspects of the present disclosure. Method 300 begins at block 310, where the behavior analysis engine 140 ingests and cleans telemetry data from a given client device 110. Because the telemetry data are transmitted in real-time, the behavior analysis engine 140 ingests the telemetry data in real-time and may receive telemetry data with missing elements, transmission errors, or nonsensical values (e.g., outliers, corruptions) or may expect to receive a response packet 210 within a time window, but not receive that response packet 210. To address the inconsistencies in the received telemetry data, the behavior analysis engine 140 cleans the received data into formats that are usable by the MLMs. In some embodiments, when cleaning the ingested data, the behavior analysis engine 140 may drop response packets 210 that include data that do not satisfy a checksum or other error checking measure, data that include outlier values, or response packets 210 received outside of a responsive time window. In other embodiments, the behavior analysis engine 140 may generate placeholder values to substitute for telemetry data that are to be cleaned, such as, for example, a last-known value, an extrapolated value, a default value, or a value known to the MLMs to be a placeholder or null value.

At block 320, the cleaned telemetry data are fed to the MLMs of the behavior analysis engine 140. Each MLM associated with the user of the client device 110, including the recommender 131, the UX engine 132, and the anomaly detector 133, may be provided some or all of the telemetry data. Because the MLMs receive data transmitted in real-time to provide recommendations in real-time, in various embodiments the MLMs are implemented via Long Short-Term Memory (LSTM) memory arrays or other MLMs that propagate the effects of inputs received over time (with lessening effect over time) without having to constantly ingest those data in a batch process. For example, a recommender 141 may ingest data from a first response packet 210 at a first time and provide a first output based on the first response packet; ingest a second response packet 210 at a second time and provide a second output based on the second and first response packets 210; ingest a third response packet 210 at a third time and provide a third output based on the third, second, and first response packets 210; etc.

At block 330, the behavior analysis engine 140 determines which content to provide to the viewer in the content stream 220. In various embodiments, the telemetry data from the client device 110 may indicate playback is in progress, not started, paused, or completed and a desired or current quality of playback. The telemetry data may also indicate a free bandwidth and processing or memory usage of the client device 110. The behavior analysis engine 140 therefore selects portions of the content item to send to the client device 110 that will balance the desired UX for the viewer with the current hardware capabilities of receiving and displaying content needed for the desired UX.

At block 340, the behavior analysis engine 140 determines whether there is sufficient bandwidth or computing resources on the client device 110 free after the provision of content for the client device 110 to receive commands to further adjust the UX. In response to determining that the client device 110 has sufficient resources at the present time to receive a UX optimization command in addition to content, method 300 proceeds to block 350. Otherwise, in response to determining that the client device 110 does not have sufficient resources at the present time to receive a command in addition to content (or that no command is warranted based on the current telemetry data), method 300 proceeds to block 360.

At block 350, the streaming server 130 encapsulates the UX command or commands into the content stream 220 for provision to the client device 110. Method 300 may then proceed to block 360.

At block 360, the streaming server 130 transmits the content selected in block 330 to the client device 110. Method 300 may then conclude.

Figure 4:
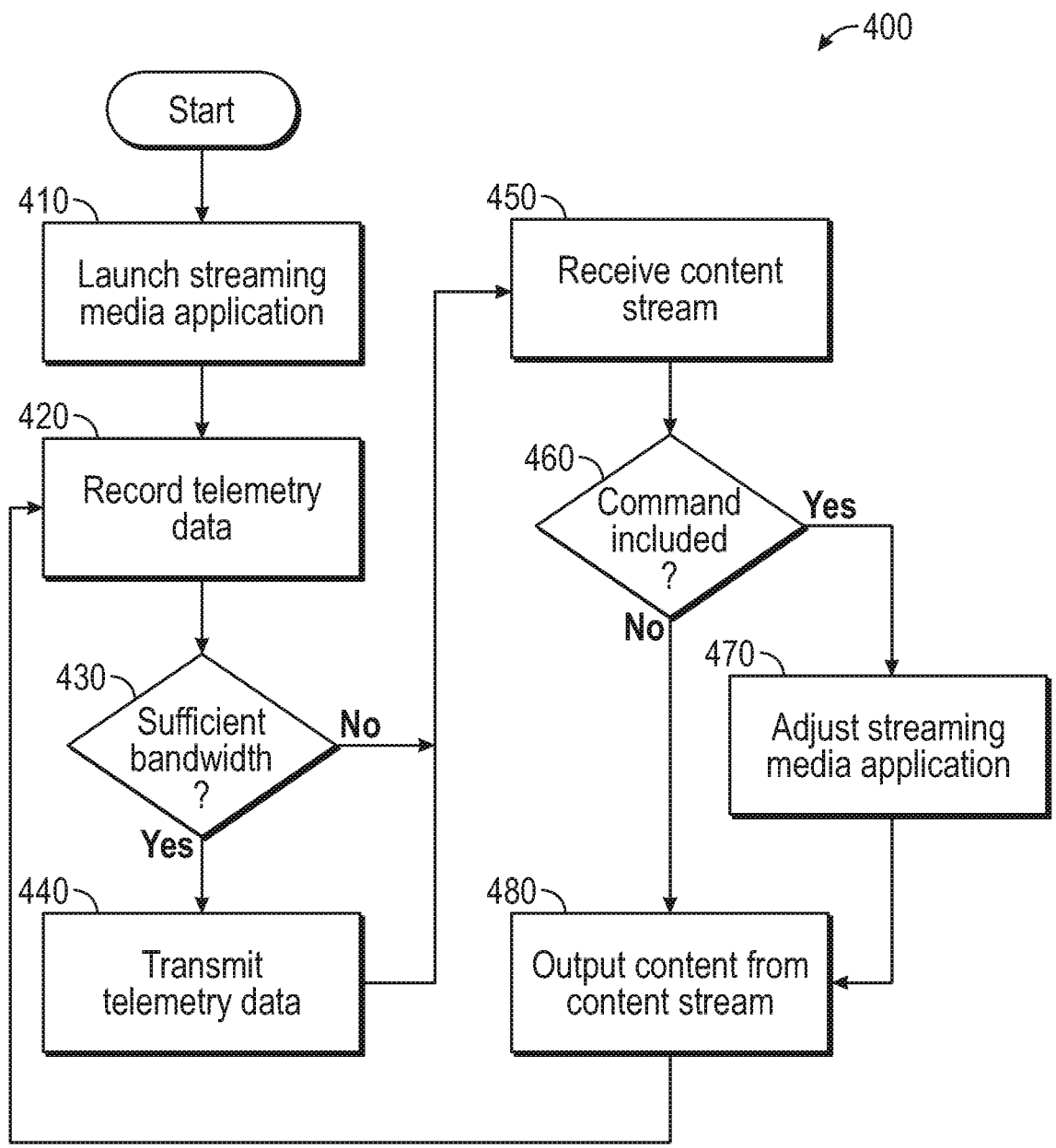
FIG. 4 is a flowchart of a method for providing user behavior for analysis in real time, according to aspects of the present disclosure.

FIG. 4 is a flowchart of a method 400 for providing user behavior for analysis in real time, according to aspects of the present disclosure. Method 400 begins at block 410 where a viewer launches a streaming media application 111 on a client device 110.

At block 420, a telemetry API 112 records telemetry data from the client device 110. In various embodiments, the telemetry API 112 may collect instantaneous data readings or running averages for the data, which may be time weighted to deprecate prior readings as time progresses.

At block 430, the telemetry API 112 determines whether sufficient resources e.g., processing resources, memory resources, uplink bandwidth) are available on the client device to transmit the telemetry data without negatively affecting the UX of the streaming media application 111. For example, the telemetry API 112 may compare the processor use rate to a threshold to determine when sufficient processing resources are available on the client device 110. In another example, the telemetry API may compare a packet size or frequency to a known uplink capacity to use as a bandwidth threshold to determine when sufficient uplink bandwidth resources are available to the client device 110. In response to determining that sufficient resources are available to transmit the telemetry data without negatively affecting the UX during the current transmission window, method 400 proceeds to block 440. In response to determining that sufficient resources as not presently available, the telemetry API 112 drops the telemetry data for the current transmission window, and method 400 proceeds to block 450 without sending telemetry data to the streaming server 130 for the current transmission window.

At block 440, the telemetry API 112 causes the client device 110 to transmit the telemetry data in a response packet 210 to the streaming server 130. Method 400 may then proceed to block 450.

At block 450, the streaming media application 111 receives a packet of a content stream 220 from the streaming server 130.

At block 460, the streaming media application 111 determines whether the content stream 220 includes one or more UX commands. In response to determining that the content stream 220 does not include a UX command, method 400 proceeds to block 480. In response to determining that the content stream 220 includes a UX command, method 400 proceeds to block 470.

At block 470, the streaming media application 111 performs the included UX command. In various aspects, the streaming media application 111 adjusts settings on the client device 110 or adjusts content reception/delivery settings within the streaming media application 111. Method 400 then proceeds to block 480.

At block 480, the streaming media application 111 outputs the content received in the content stream within the time window. In various embodiments, the content items may be output to a display device, to a memory cache for later playback, or may be delivered over the top for inclusion with the playback of the received content item if selected by the viewer.

Method 400 then returns to block 420 to continue collecting, transmitting, and reacting to UX commands issued in response to telemetry data; all in real-time.

FIG. 5 illustrates a computing device 500, according to aspects of the present disclosure. Computing device 500 includes a processor 510, a memory 520, and various hardware to provide a user with a streaming media experience. In various embodiments, a client device 110, an event database 120, a streaming server 130, a content library 150, or an administrative device 160 may each be a computing device 500 such as is described in relation for FIG. 5.

The processor 510 and the memory 520 provide computing functionality to the computing device 500. The memory 520 may be one or more memory devices, such as, for example, Random Access Memory (RAM), Read Only Memory (ROM), flash memory, or any other type of volatile or non-volatile storage medium that includes instructions that the processor 510 may execute. The processor 510, which may be any computer processor capable of performing the functions described herein.

The memory 520 generally includes program code for performing various functions related providing an AR experience to a user. The program code is generally described as various functional "applications" or "modules" within the memory 520, although alternate implementations may have different functions or combinations of functions. The memory 520 also generally includes data structures that may store information for use by the various program code modules also stored thereon. The memory 520 includes program code for an operating system 521, a streaming media application 111, a telemetry API 112, a behavior analysis engine 140, or telemetry or media data, although other applications and data structures may also be included by the memory 520.

The network interface 530 provides wireless communications for the computing device 500. In various embodiments, the network interface 530 is an electrical or optical network transmitter/receiver, which receives signals from external sources and transmits signals to external devices wirelessly via wired transmission media. In various embodiments, the network interface 530 is a radio transmitter/receiver, which receives signals from external sources and transmits signals to external devices wirelessly. The network interface 530 may be in communication with various antennas and may configure messages to be transmitted or received according to various standards, such as, Bluetooth, Wi-Fi, or a proprietary standard.

The power source 540 provides electric power to the various components of the computing device 500. Various examples of power sources 540 include batteries (rechargeable and non-rechargeable), Alternating Current to Direct Current (AC/DC) converters, Direct Current to Alternating Current (DC/AC) converters, transformers, capacitors, inductors, and wiring to connect to an external power source 540.

The positioning system 550 may provide absolute positioning information (e.g., via a Global Positioning System (GPS) receiver) and relative positioning information (e.g., via IP geocaching). The positioning system 550 may also include accelerometers, gyroscopes, and magnetometers to identify whether the computing device 500 is moving, a speed at which the computing device 500 is moving, and an orientation of the computing device 500 in the environment.

Additional Input/Output (I/O) devices 560 may be included in various embodiments of a computing device 500. The additional I/O devices 560 may include various lights, displays, and speakers (e.g. screens, LEDs, IR transmitter/receivers, speakers, etc.) for providing output from the computing device 500. The additional I/O devices 560 may include various buttons, pointing devices, and speakers (e.g. touch screens, mice, keyboards, buttons, etc.) for providing input to the computing device 500 from one or more users.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    ingesting, in real-time, current telemetry data from a client device related to a streaming media application;
    feeding the current telemetry data to one or more machine learning models (MLMs) of a behavior analysis engine that produces, in real-time, one or more User Experience (UX) commands based on results obtained from feeding the current telemetry data and prior telemetry data received from the streaming media application into the one or more MLMs, the one or more MLMs including an anomaly detector trained to recommend adjustments based on identifying how network characteristics of client devices affect content delivery, wherein the one or more UX commands comprise a delivery command to adjust content delivery settings on the client device, and wherein feeding the current telemetry data to the one or more MLMs comprises identifying the content delivery settings based on operation data in the current telemetry data and in the prior telemetry data, the content delivery settings comprising content delivery pathway settings;
    selecting content items to provide to the client device based on the current telemetry data;
    in response to determining that the client device has sufficient free resources to receive the one or more UX commands in addition to the content items in a current transmission time window while providing a predefined level of service, encapsulating the one or more UX commands with the content items in a content stream; and
    transmitting the content stream to the client device, wherein the content delivery pathway settings on the client device are adjusted based on the prior telemetry data, which indicate an optimized state of the content delivery pathway settings.

2. The method of claim 1, wherein feeding the current telemetry data to the one or more MLMs further comprises:
    identifying a new content item for provision to the client device based on playback data in the current telemetry data and in the prior telemetry data; and
    identifying software settings in the streaming media application based on interaction data in the current telemetry data and in the prior telemetry data.

3. The method of claim 1, wherein feeding the current telemetry data to the one or more MLMs further comprises identifying a new content item for provision to the client device based on playback data in the current telemetry data and in the prior telemetry data,
    wherein the one or more UX commands further comprise a content command that specifies to cache the new content item on the client device.

4. The method of claim 1, wherein feeding the current telemetry data to the one or more MLMs further comprises identifying software settings in the streaming media application based on interaction data in the current telemetry data and in the prior telemetry data,
    wherein the one or more UX commands further comprise a User Interface (UI) command that specifies to adjust the software settings to optimize a UX on the client device based on the prior telemetry data, which indicate an optimized state of the software settings.

5. The method of claim 1, further comprising:
    in response to determining that the client device does not have sufficient free resources to receive the one or more UX commands in addition to the content items in the current transmission time window while providing the predefined level of service, encapsulating the content items in a second content stream without the one or more UX commands.

6. The method of claim 1, wherein the one or more MLMs include a long short-term memory unit, and wherein the current telemetry data fed into the one or more MLMs in the current transmission time window are treated as the prior telemetry data for subsequent telemetry data fed into the one or more MLMs in a subsequent time window.

7. The method of claim 1, wherein the one or more MLMs further include at least one of a recommender or a UX engine.

8. A system, comprising:
    a processor; and
    a memory having instructions embodied therewith that when executed by the processor enable the system to perform an operation comprising:

ingesting, in real-time, current telemetry data from a client device related to a streaming media application;

feeding the current telemetry data to one or more machine learning models (MLMs) of a behavior analysis engine that produces, in real-time, one or more User Experience (UX) commands based on results obtained from feeding the current telemetry data and prior telemetry data received from the streaming media application into the one or more MLMs, the one or more MLMs including an anomaly detector trained to recommend adjustments based on identifying how network characteristics of client devices affect content delivery, wherein the one or more UX commands comprise a delivery command to adjust content delivery settings on the client device, and wherein feeding the current telemetry data to the one or more MLMs comprises identifying the content delivery settings based on operation data in the current telemetry data and in the prior telemetry data, the content delivery settings comprising content delivery pathway settings;

selecting content items to provide to the client device based on the current telemetry data;

in response to determining that the client device has sufficient free resources to receive the one or more UX commands in addition to the content items in a current transmission time window while providing a predefined level of service, encapsulating the one or more UX commands with the content items in a content stream; and transmitting the content stream to the client device, wherein the content delivery pathway settings on the client device are adjusted based on the prior telemetry data, which indicate an optimized state of the content delivery pathway settings.

9. The system of claim 8, wherein feeding the current telemetry data to the one or more MLMs further comprises:

identifying a new content item for provision to the client device based on playback data in the current telemetry data and in the prior telemetry data; and identifying software settings in the streaming media application based on interaction data in the current telemetry data and in the prior telemetry data.

10. The system of claim 8, wherein feeding the current telemetry data to the one or more MLMs further comprises identifying a new content item for provision to the client device based on playback data in the current telemetry data and in the prior telemetry data, and wherein the one or more UX commands further comprise a content command that specifies to cache the new content item on the client device.

11. The system of claim 8, wherein feeding the current telemetry data to the one or more MLMs further comprises identifying software settings in the streaming media application based on interaction data in the current telemetry data and in the prior telemetry data, and wherein the one or more UX commands further comprise a User Interface (UI) command that specifies to adjust the software settings to optimize a UX on the client device based on the prior telemetry data, which indicate an optimized state of the software settings.

12. The system of claim 8, wherein the operation further comprises:

in response to determining that the client device does not have sufficient free resources to receive the one or more UX commands in addition to the content items in the current transmission time window while providing the predefined level of service, encapsulating the content items in a second content stream without the one or more UX commands.

13. The system of claim 8, wherein the one or more MLMs include a long short-term memory unit, and wherein the current telemetry data fed into the one or more MLMs in the current transmission time window are treated as the prior telemetry data for subsequent telemetry data fed into the one or more MLMs in a subsequent time window.

14. The system of claim 8, wherein the one or more MLMs further include at least one of a recommender or a UX engine.

15. A system, comprising:

a processor;

a memory having instructions embodied therewith that when executed by the processor enable the system to perform an operation comprising:

gathering, in real-time, telemetry data for the system related to a streaming media application receiving a content stream;

in response to determining that a free bandwidth of bandwidth available to the system while receiving the content stream satisfies a threshold, transmitting, in real-time, the telemetry data to a streaming server providing the content stream, the streaming server including a behavior analysis engine configured to produce one or more User Experience (UX) commands based on results obtained from feeding the telemetry data to one or more machine learning models (MLMs), the one or more MLMs including an anomaly detector trained to recommend adjustments based on identifying how network characteristics of client devices affect content delivery, wherein the one or more UX commands comprise a delivery command, and wherein feeding the telemetry data to the one or more MLMs comprises identifying content delivery settings based on operation data in the telemetry data, the content delivery settings comprising content delivery pathway settings; and in response to receiving the delivery command, adjusting the content delivery settings, including the content delivery pathway settings, in the streaming media application based on the telemetry data, which indicate an optimized state of the content delivery pathway settings, wherein the delivery command is included in the content stream.

16. The system of claim 15, wherein the telemetry data are aggregated on the system.

17. The system of claim 15, wherein the one or more UX commands further comprise a content command, and wherein the operation further comprises, in response to receiving the content command, adjusting, in the streaming media application, how much content to cache on the system.

18. The system of claim 15, wherein the one or more UX commands further comprise a User Interface (UI) command, and wherein the operation further comprises, in response to receiving the UI command, rearranging a layout of a UI of the streaming media application.

19. The system of claim 15, wherein adjusting the content delivery settings in the streaming media application includes at least one of:

adjusting a format of the content stream;

adjusting a rate or quality of the content stream;

selecting a new intermediary source from which to request the content stream; or selecting a new host locale for the content stream.

20. The system of claim 15, wherein the telemetry data include:
- playback data related to playback of a content item included in the content stream;
- interaction data related to actions made with respect to User Interface (UI) elements within the streaming media application; and
- operational data related to network and system status.

21. The system of claim 15, wherein the one or more MLMs further include at least one of a recommender or a UX engine.

* * * * *